United States Patent
Sekiguchi et al.

(10) Patent No.: US 10,365,489 B2
(45) Date of Patent: Jul. 30, 2019

(54) SEMI-TRANSMISSIVE REFLECTION SHEET, LIGHT GUIDE PLATE AND DISPLAY DEVICE

(71) Applicant: Dai Nippon Printing Co., Ltd., Tokyo (JP)

(72) Inventors: Hiroshi Sekiguchi, Tokyo (JP); Masahiro Goto, Tokyo (JP); Kazunobu Ogawa, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/532,669

(22) PCT Filed: Apr. 3, 2015

(86) PCT No.: PCT/JP2015/060578
§ 371 (c)(1),
(2) Date: Jun. 2, 2017

(87) PCT Pub. No.: WO2016/088389
PCT Pub. Date: Jun. 9, 2016

(65) Prior Publication Data
US 2017/0322417 A1   Nov. 9, 2017

(30) Foreign Application Priority Data

Dec. 4, 2014 (JP) ................................. 2014-245812
Jan. 30, 2015 (JP) ................................. 2015-017044
Jan. 30, 2015 (JP) ................................. 2015-017045

(51) Int. Cl.
*G02B 27/14* (2006.01)
*G02B 27/01* (2006.01)
(Continued)

(52) U.S. Cl.
CPC ........... *G02B 27/0172* (2013.01); *G02B 5/09* (2013.01); *G02B 6/0018* (2013.01);
(Continued)

(58) Field of Classification Search
CPC ........ G02B 2027/0125; G02B 27/0172; G02B 27/0101; G02B 2027/0178; G02B 2027/0132; G02B 6/0018; G02B 6/0053
See application file for complete search history.

(56) References Cited

U.S. PATENT DOCUMENTS

2010/0260455 A1   10/2010   Pascal et al.
2013/0083403 A1   4/2013   Takagi et al.
(Continued)

FOREIGN PATENT DOCUMENTS

JP   2005-165271 A   6/2005
JP   2011-509417   3/2011
(Continued)

OTHER PUBLICATIONS

International Search Report and Written Opinion (PCT/JP2015/060578) dated Jun. 16, 2015 (with partial English translation).
(Continued)

*Primary Examiner* — Alicia M Harrington
(74) *Attorney, Agent, or Firm* — Burr & Brown, PLLC

(57) ABSTRACT

A semi-transmissive reflection sheet is provided, including a first optical shape layer including unit optical shapes, and a second optical shape layer laminated on the first optical shape layer from a side of a surface formed by the unit optical shapes. The unit optical shape has a first surface that is inclined with respect to a light emergent side surface of the second optical shape layer. The light emergent side surface is opposed to the first optical shape layer. The unit optical shape also has a second surface that is not parallel to the light emergent side surface. A reflection layer that reflects at least (Continued)

a part of image light traveling in the semi-transmissive reflection sheet is provided on the first surface.

17 Claims, 10 Drawing Sheets

(51) Int. Cl.
*F21V 8/00* (2006.01)
*G02B 5/09* (2006.01)
*H04N 5/64* (2006.01)

(52) U.S. Cl.
CPC .......... *G02B 6/0053* (2013.01); *G02B 6/0016* (2013.01); *G02B 6/0031* (2013.01); *G02B 2027/0125* (2013.01); *H04N 5/64* (2013.01)

(56) References Cited

U.S. PATENT DOCUMENTS

| 2013/0229712 A1* | 9/2013 | Kress ................ G02B 27/0172 359/572 |
| 2014/0092471 A1* | 4/2014 | Sadahiro ................ G03B 21/60 359/449 |
| 2015/0241619 A1* | 8/2015 | Richards .............. G02B 6/0045 362/607 |

FOREIGN PATENT DOCUMENTS

| JP | 2012-123147 A | 6/2012 |
| JP | 2013-080038 | 5/2013 |
| JP | 2014-175253 A | 9/2014 |
| JP | 2014-219673 A | 11/2014 |
| WO | 2011/121949 | 10/2011 |

OTHER PUBLICATIONS

English translation of International Preliminary Report on Patentability (Chapter I) (Application No. PCT/JP2015/060578) dated Jun. 15, 2017, 10 pages.
Japanese Notification of Reasons for Refusal (with English translation), Japanese Application No. 2014-245812, dated Jul. 14, 2015 (11 pages).
Japanese Notification of Reasons for Refusal (with English translation), Japanese Application No. 2015-017044, dated Jul. 14, 2015 (6 pages).
Japanese Decision of Refusal (with English translation), Japanese Application No. 2015-017044, dated Sep. 1, 2015 (4 pages).
Japanese Notification of Reasons for Refusal (with English translation), Japanese Application No. 2015-017045, dated Nov. 24, 2015 (6 pages).
Japanese Decision of Refusal (with English translation), Japanese Application No. 2015-017045, dated Jan. 19, 2016 (6 pages).

\* cited by examiner

SEMI-TRANSMISSIVE REFLECTION SHEET, LIGHT GUIDE PLATE AND DISPLAY DEVICE

FIELD OF THE INVENTION

The present invention relates to a semi-transmissive reflection sheet, a light guide plate and a display device.

BACKGROUND ART

A display device of a head mounted type by which a viewer views a display unit such as an LCD (Liquid Crystal Display) through an optical system has been conventionally proposed (for example, JP2011-509417A). In such a display device of a head mounted type, a light guide plate is located at a position opposed to the display unit. Thus, image light displayed by the display unit is guided by the light guide plate up to a position corresponding to eyes of the viewer, and the light is reflected by a reflection layer toward the viewer. In this display device, since a field of view of the viewer is blocked by a displayed image, a magic mirror is used in the reflection layer, for example, to obtain a see-through condition in which the viewer sees the image and external light that are overlapped. However, in this case, when a transmission factor of the magic mirror is improved to excessively lower a reflection factor, an image getting through to the viewer may become unclear. On the other hand, when the reflection factor is improved to excessively lower the transmission factor, the external light (external image) may become unclear.

DISCLOSURE OF THE INVENTION

The object of the present invention is to provide a semi-transmissive reflection sheet, a light guide plate and a display device capable of preventing an image getting through to a viewer and external light from becoming unclear.

A semi-transmissive reflection sheet according to the present invention comprises:

a first optical shape layer including unit optical shapes; and a second optical shape layer laminated on the first optical shape layer, from a side of a surface formed by the unit optical shapes;

wherein:

the unit optical shape has: a first surface that is inclined with respect to a light emergent side surface of the second optical shape layer, the light emergent side surface facing a side opposed to the first optical shape layer; and a second surface that is not parallel to the light emergent side surface; and a reflection layer that reflects at least a part of image light traveling in the semi-transmissive reflection sheet is provided on the first surface.

In the semi-transmissive reflection sheet according to the present invention, the reflection layer may be provided only on a part of the first surface.

In the semi-transmissive reflection sheet according to the present invention, the unit optical shape may define a convexity projecting toward the second optical shape layer;

the first surface and the second surface may be opposed along a sheet plane of the semi-transmissive reflection sheet;

the first surface and the second surface may be alternately arranged along an arrangement direction of the unit optical shapes; and the reflection layer of each unit optical shape may be provided on a part of the first surface, the part being close to the second surface of the unit optical shape along the arrangement direction of the unit optical shapes.

In the semi-transmissive reflection sheet according to the present invention, the reflection layer of each unit optical shape may be provided on a part of the first surface, the part including an end forming a side of the second surface of the unit optical shape along an arrangement direction of the unit optical shapes.

In the semi-transmissive reflection sheet according to the present invention, a light absorption layer that absorbs light may be provided on the second surface.

In the semi-transmissive reflection sheet according to the present invention, the second surface may have a concavo-convex shape.

In the semi-transmissive reflection sheet according to the present invention, the concavo-convex shape may include unit shapes arranged along the second surface; and in a section that is parallel to the arrangement direction of the unit optical shapes and to a normal direction of the semi-transmissive reflection sheet, when an arrangement pitch of the unit shapes is represented as $P_2$ and a distance between a bottom portion and a top portion of the unit shape is represented as $h_2$, the following expression may be satisfied.

$$0.05 \leq h_2/P_2 \leq 0.5$$

In the semi-transmissive reflection sheet according to the present invention, in a section that is parallel to the arrangement direction of the unit optical shapes and to a normal direction of the semi-transmissive reflection sheet, when an angle defined by the first surface and the light emergent side surface is represented as $\alpha$, and an angle defined by a normal direction of the light emergent side surface and the second surface 2 is represented as $\varnothing$, the following expression may be satisfied.

$$\varnothing \leq 2 \times \alpha$$

In the semi-transmissive reflection sheet according to the present invention, when a higher refractive index of the first optical shape layer or of the second optical shape layer is represented as $n_1$, and a lower refractive index is represented as $n_2$, the following expression may be satisfied.

$$\varnothing \geq \arccos(n_2/n_1)$$

The semi-transmissive reflection sheet may comprises: an optical shape part provided with the unit optical shapes; and a light guide part that guides light to the unit optical shape part.

In the semi-transmissive reflection sheet according to the present invention, the light guide part may be adjacent to the unit optical shape part.

In the semi-transmissive reflection sheet according to the present invention, the light guide part may include: a first light guide reflection surface formed by a surface of the first optical shape layer, the surface facing a side opposed to the second optical shape layer; and a second light guide reflection surface formed by a surface of the second optical shape layer, the surface facing a side opposed to the first optical shape layer.

In the semi-transmissive reflection sheet according to the present invention, the light guide part may include: a first light guide reflection surface located on a side of the first optical shape layer, the side being opposed to the second optical shape layer; and a second light guide reflection surface located on a side of the second optical shape layer, the side being opposed to the first optical shape layer.

In the semi-transmissive reflection sheet according to the present invention, the first surface and the second surface may be opposed along a sheet plane of the semi-transmissive reflection sheet.

In the semi-transmissive reflection sheet according to the present invention, in a section that is parallel to the arrangement direction of the unit optical shapes and to a normal direction of the semi-transmissive reflection sheet, the unit optical shape may have a triangular shape or a shape formed by chamfering corners of the triangular shape.

A first display device according to the present invention comprises:

any of the aforementioned semi-transmissive reflection sheet; and an image source that projects image light to the semi-transmissive reflection sheet.

A light guide plate according to the present invention is a light guide plate that guides image light incident thereon from an image source, the light guide plate comprising:

a first total reflection surface that totally reflects the image light;

a second total reflection surface that totally reflects the image light, the second total reflection surface being disposed at a position opposed to the first total reflection surface;

unit optical shapes arranged in a light guide direction of the image light, each unit optical shape having a first surface inclined with respect to the light guide direction of the image light; and a reflection layer provided on a part of the first surface, the reflection layer reflecting the image light which is guided by repeated total reflection between the first total reflection surface and the second total reflection surface, and causing the image light to emerge from the light guide plate.

In the light guide plate according to the present invention, the reflection layer may be provided on a side of the first surface toward which the image light travels.

In the light guide plate according to the present invention, the unit optical shape may be provided with a second surface formed on a side of the first surface toward which the image light travels with respect to the first surface, the second surface being opposed to the first surface; and the second surface may be provided with a light absorption layer that absorbs light.

A first display device according to the present invention comprises:

any of the aforementioned light guide plate; and an image light source that projects image light to the semi-transmissive reflection sheet.

According to the present invention, it can be prevented that image getting through to a viewer side and external information become unclear.

DETAILED DESCRIPTION OF THE INVENTION

Figure 1:
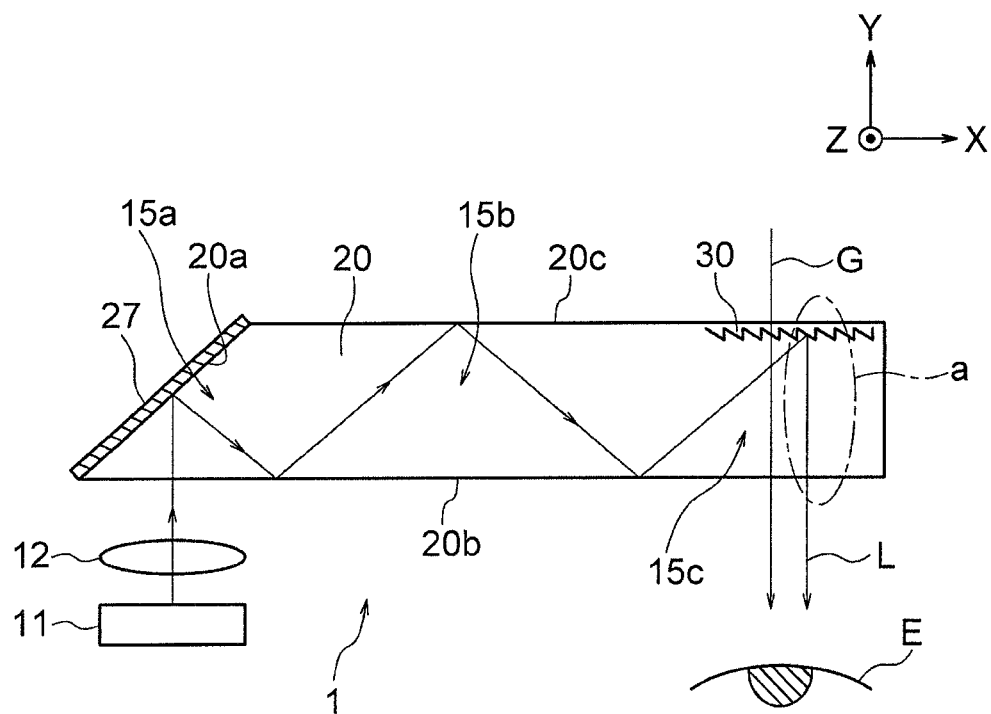
FIG. 1 is a view for explaining an embodiment of the present invention, and a view for explaining a display device.

Embodiments of the present invention will be described herebelow with reference to the drawings. In the drawings attached to the specification, a scale size, an aspect ratio and so on are changed and exaggerated from the actual ones, for the convenience of easiness in illustration and understanding.

In this specification, the terms "plate", "sheet" and "film" are not differentiated from one another, based only on the difference of terms. For example, the "sheet" is a concept including a member that can be referred to as film or plate. Thus, "semi-transmissive reflection sheet" cannot be differentiated from members referred to as "semi-transmissive reflection plate" and "semi-transmissive reflection film", based only on the difference of terms.

Furthermore, the term "sheet plane (plate plane, film plane)" means a plane corresponding to a plane direction of a sheet-like (plate-like, film-like) member as a target, when the sheet-like (plate-like, film-like) member as a target is viewed as a whole in general. In the description below, a sheet plane of a semi-transmissive reflection sheet, a light emergent surface of the semi-transmissive reflection sheet, a sheet plane of a first optical shape layer and a sheet plane of a second optical shape are parallel. A normal direction to the sheet-like (plate-like, film-like) member is a normal direction to the sheet plane (plate plane, film plane) of the sheet-like (plate-like, film-like) member.

Further, terms specifying shapes, geometric conditions and their degrees, e.g., "parallel", "perpendicular", "same", etc., are not limited to their strict definitions, but construed to include a range capable of exerting a similar function.

In the drawings referred to herebelow and the below description, in order to facilitate understanding, in a state where a viewer wears a display device 1 on his/her head, a vertical direction is referred to as Z direction, and horizontal directions are referred to as X direction and Y direction. In these horizontal directions, a direction along which image light entering a light guide plate (a right and left direction of the light guide plate) is referred to as X direction, and a direction perpendicular to the X direction (a thickness direction of the light guide plate) is referred to as Y direction. In the Y direction, −Y side is a viewer side and +Y side is a rear side.

<First Embodiment>

The display device 1 is a so-called head mount display to be worn by a viewer on his/her head, for displaying an image in front of the eyes of the viewer. As shown in FIG. 1, the display device 1 of a head mounted type in this embodiment includes, inside a not-shown glass frame, an image source (display unit) 11, a projection optical system 12, and a semi-transmissive reflection sheet 20. When the glass frame is mounted on a viewer's head, an image generated by the image source 11 can be viewed by the viewer through the semi-transmissive reflection sheet (light guide plate) 20 and so on. To be specific, the display device 1 causes image light displayed on the image source 11 to enter the semi-transmissive reflection sheet 20 through the projection optical system 12, and to guide the image light in the semi-transmissive reflection sheet 20 in the +X direction. Then, the display device 1 reflects the image light in the −Y direction perpendicular to the light guide direction, so that image information is displayed in front of an eye E of the viewer wearing the display device 1 on his/her head. Namely, in the example shown in FIG. 1, the semi-transmissive reflection sheet 20 functions as a light guide plate in the illustrated example. Thus, in terms of this function, the semi-transmissive reflection sheet 20 is also referred to as light guide plate 20. The display device 1 has a so-called see-through function by which a part of external light is caused to transmit through the light guide plate 20 to get through to the viewer, so that the image and external light are overlappingly viewed.

The image source 11 is a micro display that displays image light. For example, a transmissive liquid crystal display device, a reflective liquid crystal display device, an organic EL can be used. As the image source 11, a micro display having a diagonal not more than 1 inch, for example. The projection optical system 12 is an optical system composed of a group of lenses that convert the image light emergent from the image source 11 to parallel light and project the the parallel light. The semi-transmissive reflection sheet 20 is a substantially planar transparent member that guides light. In this embodiment, the semi-transmissive reflection sheet 20 has substantially a trapezoidal shape when seen from the vertical direction that is the Z direction, i.e., a trapezoidal prism shape. As shown in FIG. 1, the semi-transmissive reflection sheet 20 includes a first light guide reflection surface (first total reflection surface) 20b and a second light guide reflection surface (second total reflection surface) 20c which are parallel to each other and opposed to each other, and a reflection surface 20a which is disposed on an end in the −X side such that the reflection surface 20a is inclined with respect to the first light guide reflection surface 20b and the second light guide reflection surface 20c. The reflection by the first and second light guide reflection surfaces 20b and 20c is a total reflection using a refractive index difference from the view point of a layer. From this point of view, the first light guide reflection surface 20b is referred to also as first total reflection surface 20b, and the second light guide reflection surface 20c is referred to also as second total reflection surface 20c.

The reflection surface 20a is inclined at a predetermined angle with respect to the first total reflection surface 20b and the second total reflection surface 20c (X direction), and a reflection film 27 is formed all over the reflection surface 20a. The reflection surface 20a reflects image light incident on the semi-transmissive reflection sheet 20 by the reflection film 27 toward the first total reflection surface 20b. The reflection film 27 is formed of a metal having a high light reflectiveness, such as aluminum, silver or nickel. In this embodiment, the reflection film 27 is formed by depositing aluminum. However, not limited thereto, the reflection film 27 may be formed by sputtering a metal having a high light reflectiveness, transferring a metal foil, applying a paint containing a metal film, and so on. In order that the image light reflected by the reflection film 27 is totally reflected by the first total reflection surface 20b, the reflection surface 20a is inclined at an angle within a range between 25° and 40° with respect to the first total reflection surface 20b.

The first total reflection surface 20b is a surface that is parallel to the XZ plane and is located on the viewer side (−Y side), out of the surfaces constituting the semi-transmissive reflection sheet 2. The first total reflection surface 20b totally reflects the image light having been reflected by the reflection film 27 toward the second total reflection surface 20c. In addition, the first total reflection surface 20b totally reflects the image light having totally been reflected by the second total reflection surface 20c toward the second total reflection surface 20c. In the first total reflection surface 20b, an end on the −X side serves as a light incident surface onto which the image light projected from the image source 11 falls and an end on the +X side serves as a light emergent surface from which the image light reflected by a below-described unit optical shape emerges outside the semi-transmissive reflection sheet 20. Namely, in the illustrated example, the semi-transmissive reflection sheet 20 includes a light incident part 15a onto which the image light from the image source 11 falls, a light guide part 15b that guides the image light, and an optical shape part 15c adjacent to the light guide part 15b, which reflects the image light from the light guide part 15b to cause the image light to emerge therefrom. The second total reflection surface 20c is a surface that is parallel to the XZ plane and is located on the rear side (+Y side) (surface away from the viewer side), out of the surfaces constituting the semi-transmissive reflection surface 20. The second total reflection surface 20c totally reflects the image light having totally been reflected by the first total reflection surface 20b toward the first total reflection surface 20b. Thus, the image light reflected by the reflection film 27 is guided in the semi-transmissive flection sheet 20 in the +X direction (light guide direction) by the repeated total reflection between the first total reflection surface 20b and the second total reflection surface 20c.

Figure 2:
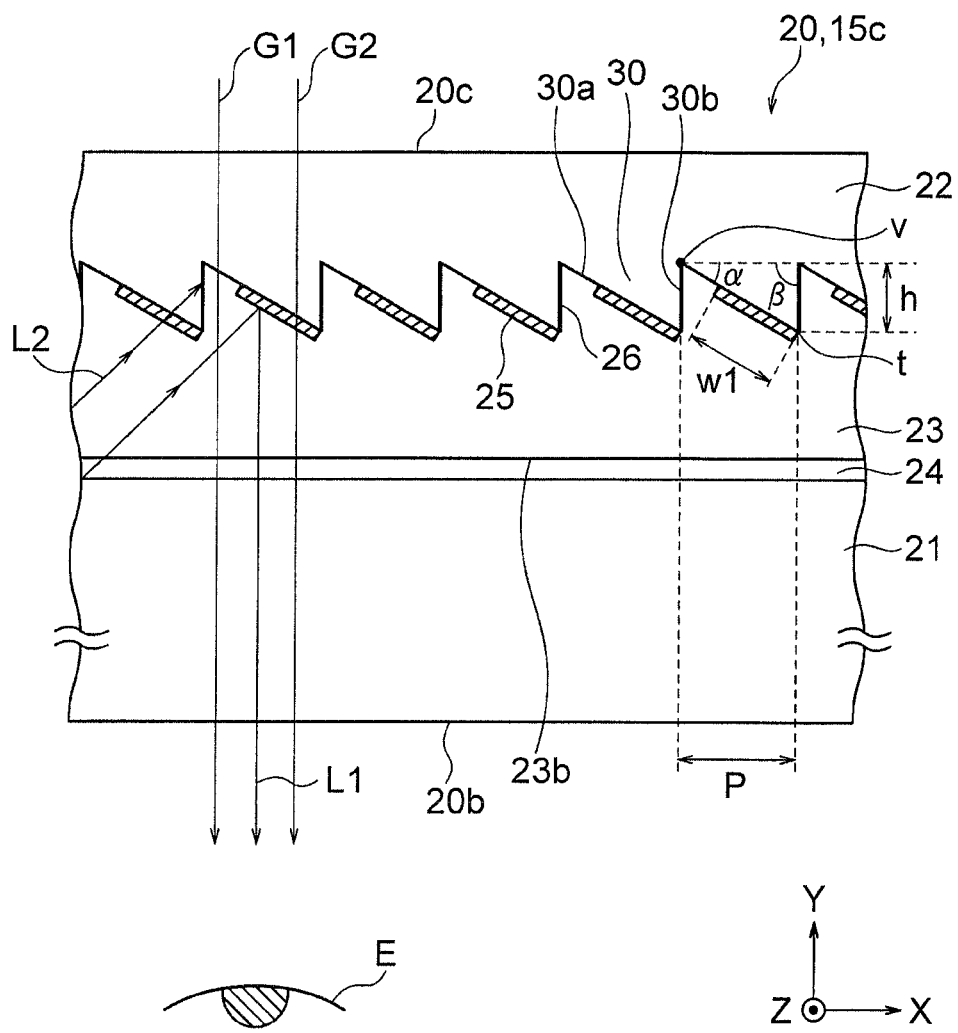
FIG. 2 is a sectional view of a first example of a semi-transmissive reflection sheet.

Next, a layer structure of the semi-transmissive reflect sheet 20 is described. FIG. 2 is a view for explaining details of the semi-transmissive reflection sheet 20 in this embodiment, showing in detail an area a in FIG. 1. As shown in FIG. 2, the semi-transmissive sheet 20 has a substrate part 21, a joint layer 24, a second optical shape layer 23 and a first optical shape layer 22, which are laminated in this order from the viewer side (−Y side). The substrate part 21 is a planer member serving as a base of the semi-transmissive reflection sheet 20, and is formed of a resin having a high light transmissivity, such as an acrylic resin, a styrene resin, an acryl styrene resin, a polycarbonate resin, an alicyclic polyolefin resin or the like. The aforementioned first total reflection surface (first light guide reflection surface) 20*b* is formed of a surface of the substrate part 21 on the viewer side (−Y side).

The first optical shape layer 22 is a layer that is most distant from the viewer side of the semi-transmissive reflection sheet 20. The first optical shape layer 22 is formed of a resin having a high light transmissivity, such as a urethane acrylate resin, an epoxy acrylate resin or the like. A refractive index of the first optical shape layer 22 is equivalent to that of the aforementioned substrate part 21. The first optical shape layer 22 is provided with unit optical shapes (unit optical elements, unit shape elements) 30 on a surface thereof on the viewer side (−Y side) at a location near an end on the +X side, in other words, in an area defining the optical shape part 15*c*. The unit optical shapes 30 extend in the vertical direction (Z direction) and are arranged along the X direction. In addition, in order that each unit optical shape 30 forms a convexity projecting toward the viewer side (−Y side), the unit optical shape 30 is formed such that a sectional shape in a section that is parallel both to the arrangement direction of the unit optical shapes 30 and to the normal direction of the semi-transmissive reflection sheet (hereinafter referred to also as "main section of the semi-transmissive reflection sheet"), i.e., a sectional shape in a section parallel to the XY plane is a triangular shape or a shape formed by chamfering corners of the triangular shape. Namely, the unit optical shape 30 is formed to have a prism shape. The unit optical shape 30 has a first surface 30*a*, and a second surface 30*b* located oppositely to the first surface 30*a* on a side toward which the image light travels (+X side). The aforementioned second total reflection surface (second light guide reflection surface) 20*c* is formed of a surface of the first optical shape layer 22 on a rear side thereof (+Y side).

In this embodiment, although the unit prism shapes 30 have a linear prism shape extending in the vertical direction (Z direction), for example, the present invention is not limited thereto and the unit prism shapes 30 may have a linear Fresnel lens shape or a circular Fresnel lens shape in which the unit optical shapes 30 are concentrically arranged.

The first surface 30*a* is a surface onto which the image light having totally been reflected by the first total reflection surface 20*b* directly falls. A reflection layer 25 is provided on the +X side (side toward which the image light travels) of the surface. The second surface 30*b* is a surface onto which the image light having totally been reflected by the first total reflection surface 20*b* does not directly fall. A light absorption layer 26 is provided all over the second surface 30*b*.

The second optical shape layer 23 is a layer disposed on a surface of the first optical shape layer 22 on the viewer side so as to cover the unit optical shapes 30. The object of the provision of the second optical shape layer 23 it to make flat the surface of the first optical shape layer 22 on the viewer side (−Y side). A surface 23*b* of the second optical shape layer 23 on the viewer side (−Y side), i.e., a light emergent side surface 23*b* of the second optical shape layer 23 is parallel to the sheet plane of the semi-transmissive reflection sheet 20 and a light emergent surface 20*b* of the semi-transmissive reflection sheet 20, whereby parallel also to the XZ plane. The light emergent side surface 23*b* of the second optical shape layer 23 on the viewer side is a surface joined to the substrate part 21 through the joint layer 24, and serves as a light emergent surface of light passing from the second optical shape layer 23 through the substrate part 21. The light emergent surface of the second optical shape layer 23 is parallel to the first total reflection surface 20*b* (light emergent surface) of the light guide plate 20. The substrate part 21 disposed on the viewer side of the second optical shape layer 23 may be omitted, and the surface of the second optical shape layer 23 on the viewer side may serve as the light emergent surface of the light guide plate 20.

The second optical shape layer 23 is formed of a resin having a high light transmissivity, such as a urethane acrylate resin, an epoxy acrylate resin or the like. In the first embodiment, a refractive index of the second optical shape layer 23 is equivalent to those of the aforementioned substrate part 21 and the first optical shape layer 22.

An angle defined by the first surface 30*a* of the unit optical shape 30 with respect to a plane (XZ plane) parallel to the first total reflection surface 20*b* is represented as $\alpha$. In addition, an angle defined by the second surface 30*b* with respect to a plane parallel to the first total reflection surface 20*b* is represented as $\beta(\beta>\alpha)$. Further, an arrangement pitch of the unit optical shapes 30 is represented as P, and a height of the unit optical shape 30 (a distance from a top portion t of the unit optical shape 30 to a valley bottom portion (valley portion) between the unit optical shapes 30 in the normal direction (thickness direction, Y direction) of the semi-transmissive reflection sheet) is represented as h. The arrangement pitch P is equivalent to a width size of the unit optical shape 30 in the arrangement direction (X direction). In order to facilitate understanding, FIG. 2 and so on show that the arrangement pitch P, the angle $\alpha$, the angle $\beta$ and the height h of the unit optical shapes 30 are constant in the arrangement direction of the unit optical shapes 30. Actually, in the present invention, although the arrangement pitch P is constant, the angle $\alpha$ gradually increases as it moves toward the side toward which the image light travels (+X side), and the height h increases in accordance therewith. However, not limited thereto, the arrangement pitch P, the angle $\alpha$, the angle $\beta$ and the height h may be constant.

The joint layer r24 is an adhesive layer that joins the substrate 21*a* and the second optical shape layer 23. In order to prevent refraction of the image light transmitting through between the substrate part 21 and the second optical shape layer 23, the joint layer 24 is formed of a material having a refractive index equivalent to those of these layers, for example, a material having a high light transmissivity, such as a urethane acrylate resin, an epoxy acrylate resin, an acryl-based adhesive, a silicone-based adhesive or the like. Due to the above structure, the respective layers constituting the semi-transmissive reflection sheet 20 have the refractive indexes of light equivalent to one another. The refractive indexes equivalent to one another mean not only the case in which the refractive indexes of the respective layers are completely the same with one another, but also the case in which the refractive indexes are similar to one another to such a degree that there occurs no refraction between the respective layers. Thus, the semi-transmissive reflection sheet 20 in this embodiment can prevent refraction of image light and external light in the semi-transmissive reflection sheet 20.

The reflection layer 25 is a layer disposed on the first surface 30*a* of the unit optical shape 30, the layer being formed of a metal having a high transmissivity, such as aluminum, silver, nickel or the like. In this embodiment, the reflection layer 25 is formed is depositing aluminum. However, not limited thereto, the reflection layer 25 may be formed by sputtering a metal having a high light reflectiveness, transferring a metal foil, applying a paint containing a metal film, and so on. As long as the reflection layer 25 has a thickness sufficient for reflecting light, a thickness thereof can be freely set depending on its material and so on. In addition, the reflection layer 25 may be of a magic mirror (half mirror) type that reflects a part of image light and transmits therethrough external light entering thereon from the rear side (+Y side) of the semi-transmissive reflection sheet 20. Its values of a reflection factor and a transmission factor can be suitably set. The reflection layer 25 in this embodiment is formed as a half mirror having a reflection factor and a transmission factor that are both 45%.

The reflection layer 25 is located on the first surface 30a at a position on the side toward which the image light travels (+X side) in the semi-transmissive reflection sheet 20. In other words, the reflection layer 25 on each unit optical shape 30 is located on the first surface 30a at a portion near the second face 30b of this unit optical shape 30 along the arrangement direction of the unit optical shapes 30. In yet other words, the reflection layer 25 is formed from the top portion t of the first surface 30a toward the bottom portion v thereof to have a predetermined width, but the reflection layer 25 is not formed near the bottom portion v of the first surface 30a. That is to say, the reflection layer 25 is formed only on a portion of the first surface 30a, which contributes to the reflection of image light having totally been reflected by the first reflection surface 20b, i.e., only on a portion onto which the image light having totally been reflected by the first reflection surface 20b can fall. Meanwhile, the reflection layer 25 is not formed on a portion which is shadowed by the adjacent unit optical shape 30 so that it does not contribute to the reflection of image light. Since the reflection layer 25 is thus formed, the semi-transmissive reflection sheet 20 can not only cause image light guided in the semi-transmissive reflection sheet 20 to be reflected by the reflection layer 25 of the first surface 30a to emerge from the semi-transmissive reflection sheet 20, but also can cause external light falling thereon from the rear side of the semi-transmissive reflection sheet 20 to transmit through the first surface 30a from the portion on which the reflection layer 25 is formed toward the viewer side. In addition, since the reflection layer in this embodiment is not disposed only on the portion of the first surface 30a, which does not contribute to the reflection of image light, quantity of light reflected by the reflection layer does not decrease as compared with a case in which the reflection layer is formed all over the the first surface 30a. In order to cause the image light to be reflected to emerge from the semi-transmissive reflection sheet 20 efficiently, the height h of the unit optical shape 30 is preferably in a range of 8 μm≤h≤700 μm. In addition, the arrangement pitch P of the unit optical shapes 30 is preferably in a range of 50 μm≤P≤1000 μm. Further, when a length of the reflection layer 25 with respect to a plane parallel to a lens plane is represented as W1 w1, t the reflection layer 25 is preferably formed to satisfy w1=P×sin (90°−2×α)/sin(90°+α).

The light absorption layer 26 is a layer that absorbs light, which is formed all over the plane of the second surface 30b. The light absorption layer 26 is formed of a dark colored material. Thus, in the semi-transmissive reflection sheet 20 in this embodiment, even when a part of image light falling onto the reflection layer 25 of the first surface 20a transmits through the reflection layer 25 to enter the first optical shape layer 22, the light can be absorbed by the light absorption layer 26 (see L2 of FIG. 2). Thus, generation of ghost in the image emerged from the semi-transmissive reflection sheet 20 can be prevented. The light absorption layer 26 is formed of a material made by adding a paint containing a dark colored, e.g., black colored pigment or dye as a light absorption material, and/or beads containing a dark colored, e.g., black colored pigment or dye, to a urethane-based resin, an acryl-based resin, an epoxy-based resin, or a resin mixture thereof, as a base material.

Next, movements of image light L and external light G incident on the semi-transmissive reflection sheet 20 in this embodiment are described. As shown in FIG. 1, the image light L emergent from the image source 11 enters the first total reflection surface 20b of the semi-transmissive reflection sheet 20 through the projection optical system 12. The image light L incident on the semi-transmissive reflection sheet 20 enters the reflection film 27 of the reflection surface 20a so as to be reflected toward the first total reflection surface 20b. Then, the image light L enters the first total reflection surface 20b to be totally reflected toward the second total reflection surface 20c, and thereafter the image light L enters the second total reflection surface 20c to be totally reflected toward the first total reflection surface 20b. By means of the repeated total reflection between the first total reflection surface 20b and the second total reflection surface 20c, the image light L is guided from the −X side of the semi-transmissive reflection sheet 20 toward the +X side thereof, and enters the unit optical shapes 30 disposed on the first optical shape layer 22. As shown in FIG. 1, the semi-transmissive reflection sheet 20 in this embodiment is formed such that the image light L is totally reflected by the first total reflection surface 20b twice and is totally reflected by the second total reflection surface 20c once. However, not limited thereto, the total reflection may be more repeated on the respective surfaces.

As shown in FIG. 2, a part of image light L1 of the image light incident on the unit optical shapes 30 in the optical shape part 15c enters the reflection layer 25 of the first surface 30a to be reflected in a direction (−Y direction) substantially perpendicular to the first total reflection surface 20b, and emerges from the light emergent surface (first total reflection surface) 20b toward the eye E of the viewer. On the other hand, other image light L2 transmits through the reflection layer 25, which is formed as a half mirror, to enter the unit optical shape 30, and the image light L2 enters the light absorption layer 26 of the second surface 30b to be absorbed therein. As shown in FIG. 1, the external light G enters the semi-transmissive reflection sheet 20 from the rear side (+Y side) of the semi-transmissive reflection sheet 20. As shown in FIG. 2, a part of the external light G1, out of the external light G incident on the semi-transmissive reflection sheet 20, transmits through the first surface 30a at the portion on which the reflection layer 25 is not formed, so as to emerge from the light emergent surface (first total reflection surface) 20b toward the eye E of the viewer. On the other hand, other image light G enters the reflection layer 25 of the first surface 30a. A part of the external light G is reflected by the reflection layer 25 toward the rear side of the semi-transmissive reflection sheet 20, while another part of light G2 transmits through the reflection layer 25, which is formed as a half mirror, so as to emerge from the light emergent surface (first total reflection surface) 20b toward the eye E of the viewer.

Figure 3:
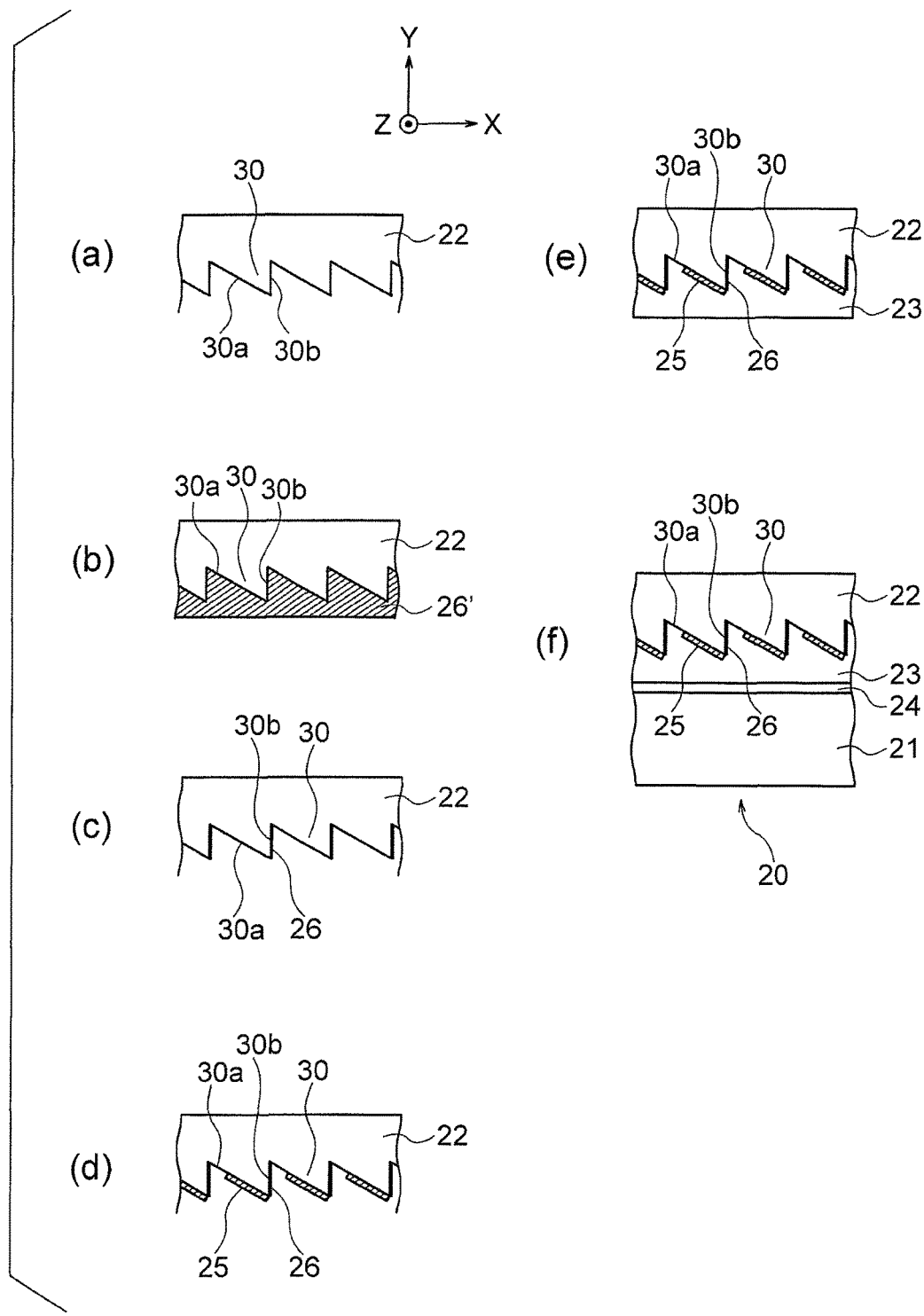
FIG. 3 is a view for explaining an example of a method for manufacturing the semi-transmissive reflection sheet shown in FIG. 2.

Next, a method of manufacturing the semi-transmissive reflection sheet (light guide plate) 20 in this embodiment is described. FIG. 3 is a view for explaining the method of manufacturing the semi-transmissive reflection sheet 20 in this embodiment. FIGS. 3(a) to 3(f) are views showing a process of manufacturing the semi-transmissive reflection sheet 20. Firstly, as shown in FIG. 3(a), the first optical shape layer 22 constituting the semi-transmissive reflection sheet 20 is formed with the use of a mold having a concavo-convex shape corresponding to the unit optical shapes 30, by means of an extrusion molding process, an injection molding process, a shaping method using an ionizing radiation cured-type resin (in particular, 2P process for shaping an ionizing radiation cured-type resin on a substrate) or the like.

Then, as shown in FIG. 3(*b*), a resin layer 26' is formed by, e.g., dipping a material forming the light absorption layer 26 over all the surface of the first optical shape layer 22 on which the unit optical shapes 30 are formed. Thereafter, as shown in FIG. 3(*c*), a portion of the resin layer 26', which is not needed to form the light absorption layer 26, is removed. In this embodiment, since the light absorption layer 26 is formed only on the second surface 30*b* of the unit optical shape 30, the resin applied to the surface on which the unit optical shapes 30 of the first optical shape layer 22 are formed, except the second surface 30*b*, is irradiated with a laser beam so as to be removed. Then, as shown in FIG. 3(*d*), aluminum is deposited on the first surface 30*a* of the unit optical shape 30 by a vacuum deposition process, so that the reflection layer 25 is formed. Alternatively, the reflection layer 25 may be formed by applying a paint containing a light reflecting material.

After that, as shown in FIG. 3(*e*), the surface of the first optical shape layer 22 on which the unit optical shapes 30 are formed is filled with a resin constituting the second optical shape layer 23. The resin is pressed by a mold having a flat surface, and cured. Then, the resin is released from the mold, so that the second optical shape layer 23 is formed. Then, as shown in FIG. 3(*f*), the second optical shape layer 23 formed on the unit optical shapes 30 and the planar substrate part 21 are attached to each other through the joint layer 24, whereby a laminate having the substrate part 21, the joint layer 24, the second optical shape layer 23 and the first optical shape layer 22, which are laminated in this order, is completed. Finally, the laminate is cut into a predetermined shape, and the reflection surface 20*a* is formed by processing a corner portion on the rear side (−Y side) in the −X side (side opposite to the side on which the unit optical shapes are formed). The reflection film 27 is formed by depositing aluminum on the reflection surface 20*a* by a vacuum deposition process or the like. In this manner, the semi-transmissive reflection sheet (light guide plate) 20 is completed.

In the aforementioned semi-transmissive reflection sheet (light guide plate) 20, the reflection layer 25 functioning as a half mirror is formed on the first surface 30*a* of the unit optical shape 30. Thus, the image light can be reflected by the reflection layer 25 of the first surface 30*a*, while the external light can be transmitted through the reflection layer 25 of the first surface 30*a* toward the viewer side. In particular, in the semi-transmissive reflection sheet (light guide plate) 20 in this embodiment, the reflection layer 25 is formed only on a portion of the first surface 30*a* of the unit optical shape 30. Thus, the image light can be reflected by the reflection layer 25 of the first surface 30*a*, while the external light can be transmitted toward the viewer side through the portion of the first surface 30*a* on which the reflection layer 25 is formed. According to such a semi-transmissive reflection sheet 20, the external light can be more clearly viewed without lowering clarity of the image light.

In addition, according to the semi-transmissive reflection sheet 20 in this embodiment, since the reflection layer 25 is disposed on the first surface 30*a* of the unit optical shape 30 on the side (+X side) toward which the image light travels, the image light can be more efficiently reflected toward the viewer side, while the external light can be transmitted toward the viewer side through the portion of the first surface 30*a* which does not contribute to the reflection of image light.

Further, according to the semi-transmissive reflection sheet 20 in this embodiment, since the light absorption layer 26 that absorbs light is disposed on the second surface 30*b*, even when a part of image light transmits through the reflection layer 25 to enter the first optical shape layer 22, the light can be absorbed by the light absorption layer 26. Thus, generation of ghost in image light emerging from the semi-transmissive reflection sheet 20 can be prevented.

The first embodiment has been explained above, but the first embodiment can be variously modified. Herebelow, modification examples are shown.

(1) In the aforementioned first embodiment, the reflection layer 25 of the semi-transmissive reflection sheet 20 is formed only on a portion of the first surface 30*a* of the unit optical shape 30. However, not limited thereto, since the reflection layer 25 is a half mirror having a predetermined transmission factor, the reflection layer 25 may be formed all over the first surface 30*a*.

(2) In the aforementioned embodiment, the second surface 30*b* of the semi-transmissive reflection sheet 20 is provided with the light absorption layer 26. However, not limited thereto, the light absorption layer may be omitted. For example, when the reflection layer 25 of the first surface 30*a* is formed as a mirror of a complete reflection type, instead of a magic mirror, since there is no light that transmits through the reflection layer 25, it is not necessary to particularly provide a light absorption layer. Thus, a manufacturing efficiency of the semi-transmissive reflection sheet 20 can be improved, and a manufacturing cost thereof can be decreased.

(3) In the aforementioned first embodiment, the reflection layer 25 of the semi-transmissive reflection sheet 20 is of a half mirror type. However, not limited thereto, the reflection layer may be formed such that a light transmittance factor is lower than that of a half mirror and that a reflection factor is higher than that of the half mirror. In this case, an amount of external light that transmits through the reflection layer 25 decreases, but the external light transmits toward the viewer side through the portion of the first surface 30*a* on which the reflection layer 25 is formed. Thus, the external light can be viewed and the image light can be more clearly viewed by the viewer wearing the display device 1 on his/her head.

Figure 4:
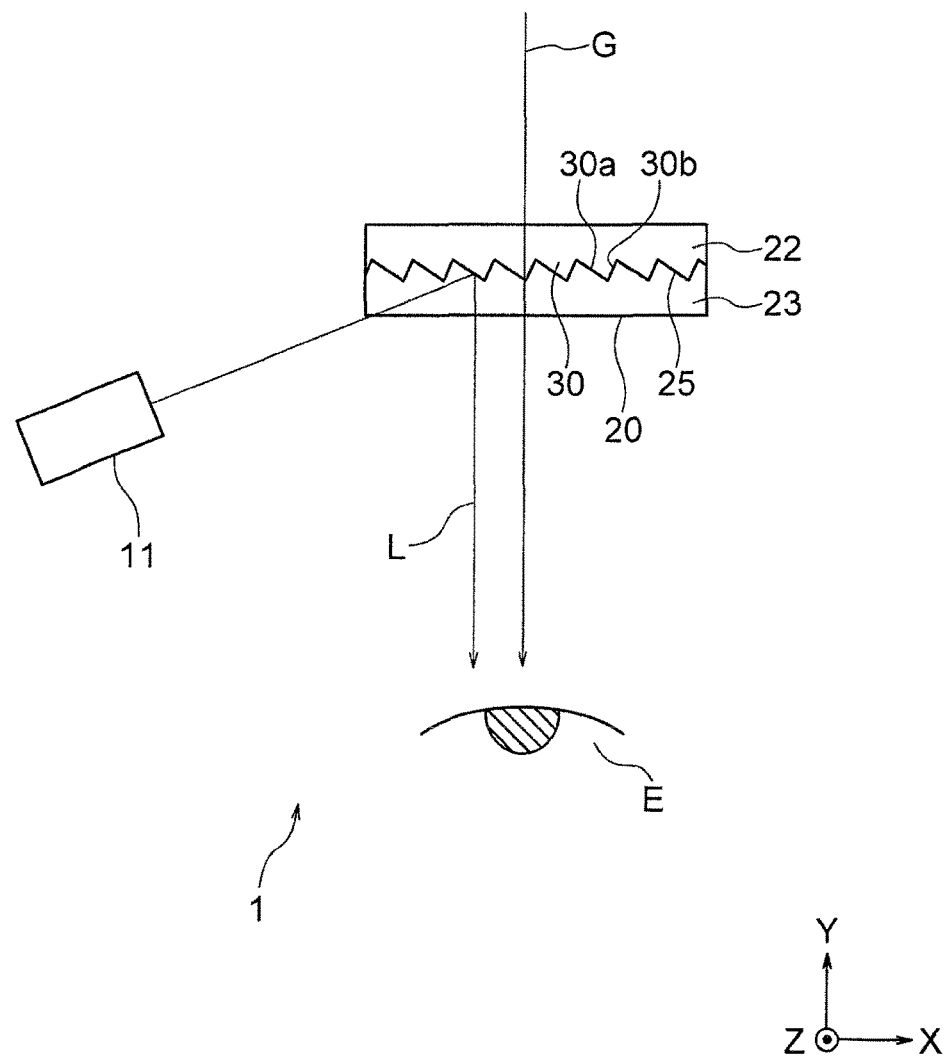
FIG. 4 is a view showing a modification example of the display device.

(4) In the aforementioned embodiment, the semi-transmissive reflection sheet 20 includes the light guide part 15*b* so as to function as a light guide plate, but the present invention is not limited thereto. For example, as shown in FIG. 4, the semi-transmissive reflection sheet 20 may not guide image light from the image source 11 of the display device 1 but may function as a reflection sheet that directly reflects the image light by the first surface 30*a* toward the viewer. Namely, the semi-transmissive reflection sheet 20 of FIG. 4 includes the light incident part 15*a* and the optical shape part 15*c* adjacent to the light incident part 15*a*. In this example, the angle α of the first surface 30*a* is preferably in the range of $5° \leq \alpha \leq 35°$, the height h of the unit optical shape 30 is preferably in the range of $5 \, \mu m \leq h \leq 700 \, \mu m$, and the arrangement pitch P of the unit optical shapes 30 is preferably in the range of $50 \, \mu m \leq P \leq 1000 \, \mu m$.

(5) In addition, the present invention can be applied to a head-up display used in a front window of an automobile or the like, and a screen transmitting external light of a background, and so on.

(6) Further, when the semi-transmissive reflection sheet is applied to a large virtual image projection such as a combiner, the unit optical shape may be formed into a Fresnel lens shape.

(7) In the aforementioned embodiment, in the semi-transmissive reflection sheet 20, the first total reflection surface 20b and the surface onto which the image light falls are formed in the same plane. However, not limited thereto, the first total reflection surface and the surface onto which the image light falls may be formed as different planes. In addition, in the aforementioned embodiment, in the semi-transmissive reflection sheet 20, the first total reflection surface 20b and the surface from which the image light emerges are formed in the same plane. However, not limited thereto, the first total reflection surface and the the surface from which the image light emerges may be formed as different planes.

<Second Embodiment>

Next, a display device according to a second embodiment is described. In the second embodiment, the structures related to the unit optical shape 30 and the light absorption layer 26 in the aforementioned first embodiment are modified. The second embodiment differs from the first embodiment in the following points. On the other hand, the second embodiment may have the same structure as that of the first embodiment, except the matters described below.

Figure 5:
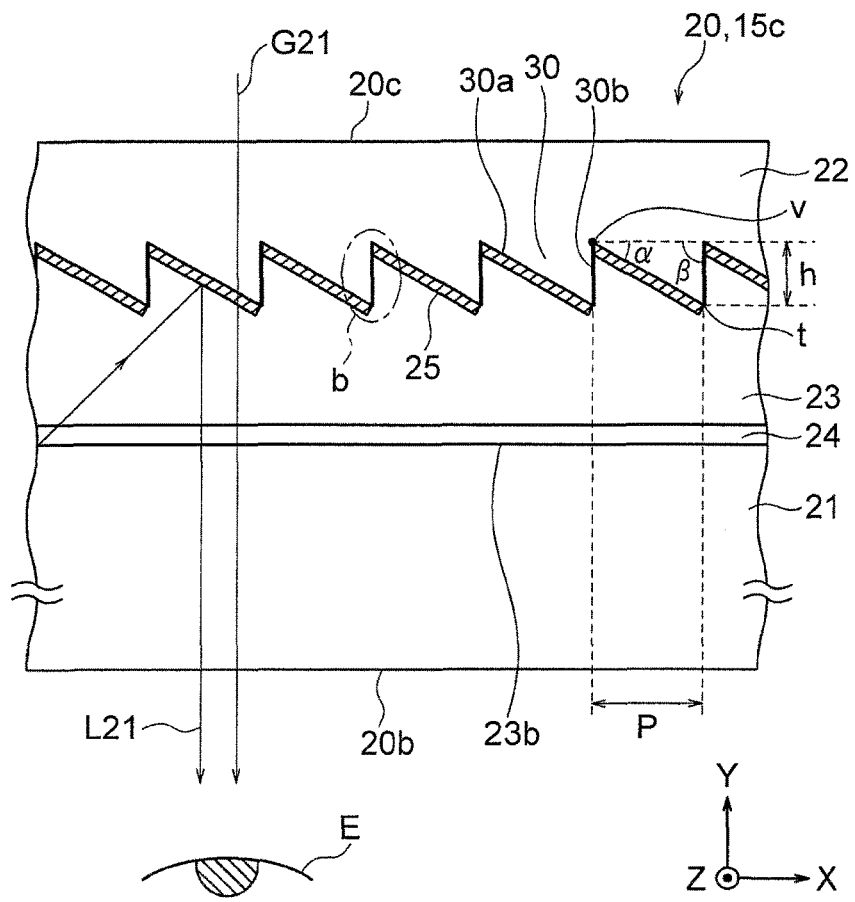
FIG. 5 is a view corresponding to FIG. 2, and a view for showing a second example of the semi-transmissive reflection sheet.
Figure 6:
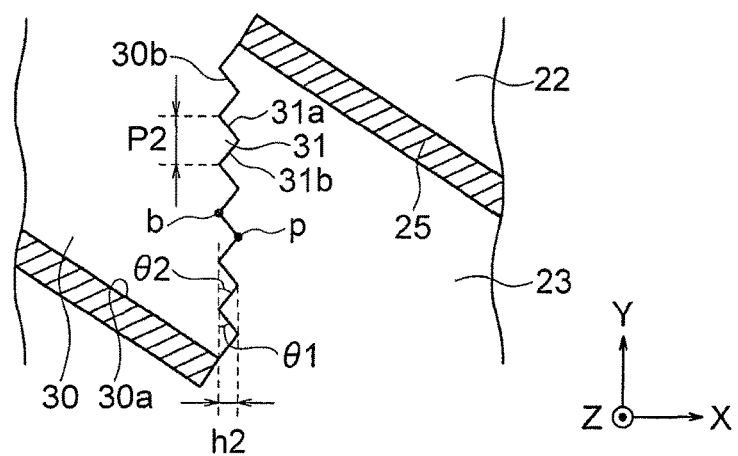
FIG. 6 is a partial enlarged view of FIG. 5, and a view showing a second surface of a unit optical shape.

As shown in FIG. 5, a semi-transmissive reflection sheet 20 in the second embodiment includes the first optical shape layer 22, the second optical shape layer 23, the joint layer 24 and the substrate part 21, which are described in the first embodiment. As shown in FIGS. 5 and 6, the unit optical shape 30 of the first optical shape layer 22 has a first surface 30a and a second surface 30b. In the illustrated example, the reflection layer 25 is formed all over the first surface 30a. On the other hand, the second surface 30b is not provided with the light absorption layer 26. The first optical shape layer 22 and the second optical shape layer 23 are in contact with each other via the second surface 30b to form an interface therebetween.

Figure 7:
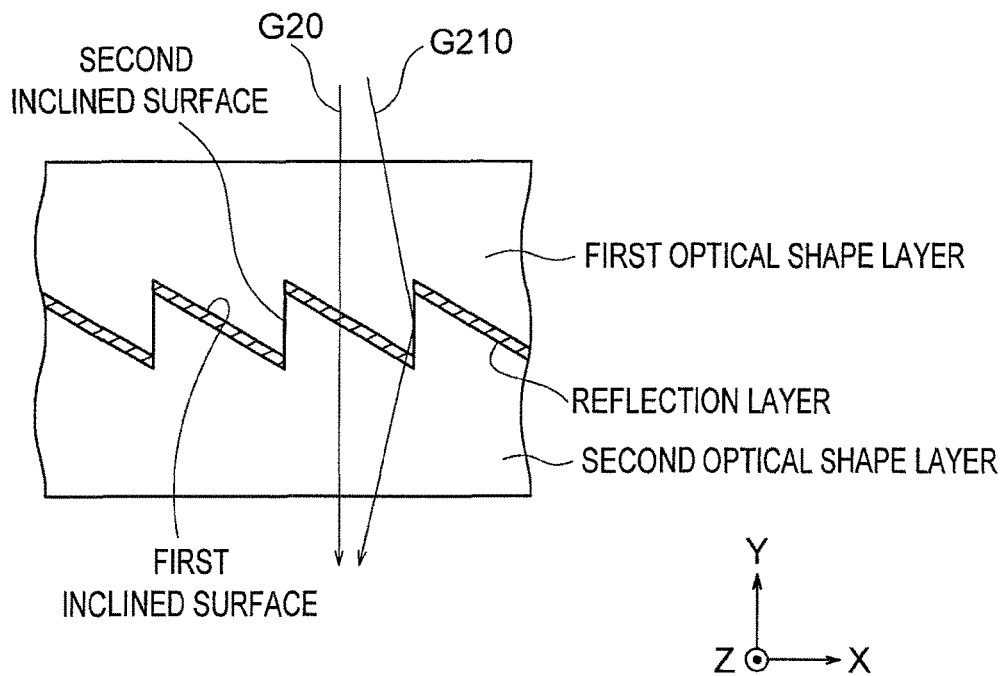
FIG. 7 is a view showing an example of a trajectory of external light incident on the second surface which is a flat surface.
Figure 8:
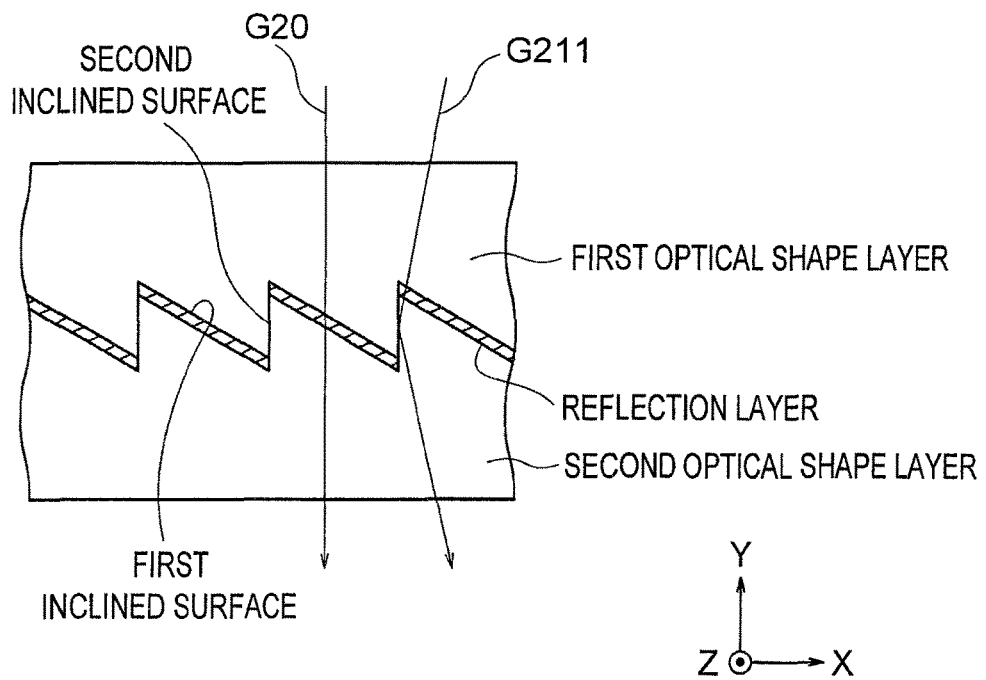
FIG. 8 is a view showing another example of a trajectory of external light incident on the second surface which is a flat surface.

As described in the first embodiment, the first optical shape layer 22 and the second optical shape layer 23 are formed by the same material, such that the refractive indexes of the layers are basically equivalent to each other. However, a slight refractive index difference (e.g., ¹/₁₀₀₀ or less) may possibly occur. For example, when the refractive index of the first optical shape layer is greater than the refractive index of the second optical shape layer, as shown in FIG. 7, a part of external light G210 having transmitted through the first optical shape layer is totally reflected by the second surface. Thus, the light gets through to the viewer side in such a manner that the light is slightly inclined with respect to the normal direction of the light emergent surface. On the other hand, when the refractive index of the first optical shape layer is less than the refractive index of the second optical shape layer, as shown in FIG. 8, a part of external light G211 having transmitted through the first optical shape layer and the second optical shape layer is totally reflected by the second surface. Thus, the the light gets through to the viewer side in such a manner that it is slightly inclined with respect to the normal direction of the light emergent surface. When the external light gets through to the viewer side in such a manner that it is slightly inclined with respect to the normal direction of the light emergent surface, the slightly inclined external light G210 or G211. emerges at a positon near external light G20 that emerges in the front direction. In this case, a dual image, i.e., a ghost is generated which makes unclear the external light viewed by the viewer.

Thus, in order to overcome the aforementioned generation of ghost problem, as shown in FIG. 6, the second surface 30b of the semi-transmissive reflection sheet 20 in the second embodiment is provided with a micro concavo-convex shape. Due to the provision of the micro concavo-convex shape on the second surface 30b, light incident on the second surface 30b, out of external light incident on the light guide plate from the rear side thereof light, can be prevented from being totally reflected by the second surface 30b. Thus, the light guide plate 20 can prevent that the ghost is generated and that the external light viewed by the viewer becomes unclear.

As shown in FIG. 6, the micro concavo-convex shape is constituted by arranging unit shapes 31 in the thickness direction of the the light guide plate 20 (Y direction) along the second surface 30b, each unit shape 31 being convex from the second surface 30b to extend in the vertical direction (Z direction).

The unit shape 31 in the second embodiment is formed such that a sectional shape in a section that is parallel to its arrangement direction (the thickness direction of the light guide plate 20, Y direction) and is parallel to the arrangement direction of the unit optical shapes 30 (X direction) is a triangular shape or a shape formed by chamfering corners of the triangular shape. Each unit shape 31 has an inclined surface 31a and an inclined surface 31b opposed to the inclined surface 31a. In order to more efficiently avoid the ghost generation, when an arrangement pitch of the unit shapes 31 is represented as $P_2$, a distance (height) from a bottom portion b of the unit shape 31 to a top portion p thereof is represented as $h_2$, and an aspect ratio between the height $h_2$ and the pitch $P_2$ is represented as $A=h_2/P_2$, the micro concavo-convex shape preferably satisfies the following expression (1). The distance (height) $h_2$ from the bottom portion b to the top portion p of the unit shape 31 is a height along the normal direction of the second surface 30b when it is generally seen, in other words, a height along a direction perpendicular to a line connecting the top portion t and the valley portion v of the unit optical shape 30 in the main section of the semi-transmissive reflection sheet.

$$0.05 \leq A \leq 0.5 \qquad \text{Expression (1)}$$

Figure 9:
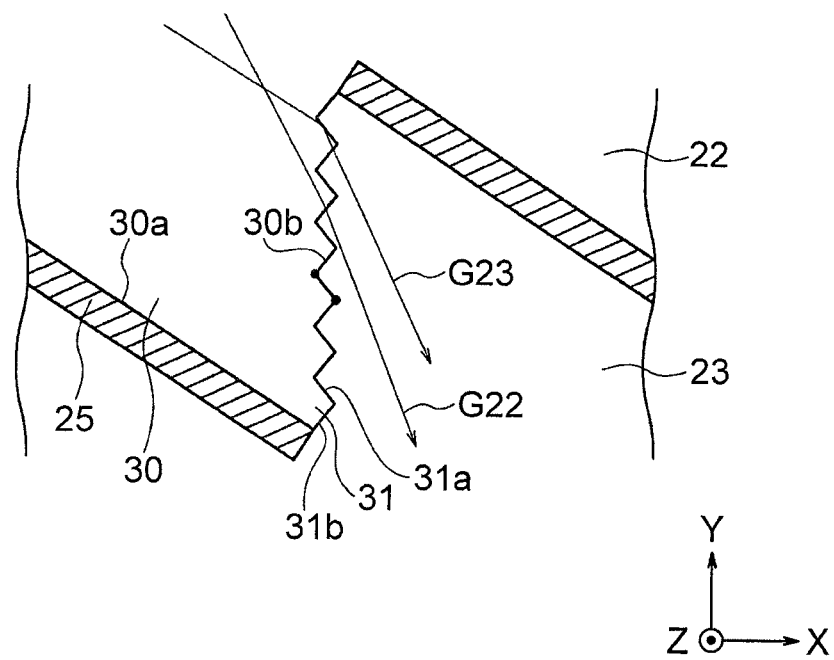
FIG. 9 is a view showing a trajectory of external light incident of the second surface shown in FIG. 6.

By forming the unit optical shapes 30 so as to satisfy the above Expression (1), a part of light incident on the second surface 30b, out of the external light incident on the light guide plate 20 from the rear side thereof, is diffused by the micro concavo-convex shape, while another part of light emerges at a position distant from the front of the viewer without being totally reflected by the second surface 30b (see G22 in FIG. 9). Thus, the light guide plate 20 in this embodiment can prevent the generation of ghost and make clear the external light getting through to the viewer side. If the aspect ratio A is less than 0.05, the external light is likely to be totally reflected by the second surface 30b, so that the effect of preventing the ghost generation is lowered, which is not preferred. On the other hand, when the aspect ratio A is greater than 0.5, there is a possibility that a part of image light enters the inclined surface 31b, which is not preferred. Thus, with a view to sufficiently preventing total reflection inviting the aforementioned ghost generation, a rate of the inclined surfaces 31a and 31b of the unit shape 31 in the second surface 30b is preferably 30% or more. In addition, in the second embodiment, the arrangement pitch $P_2$ and the height $h_2$ of the unit shapes 31 are constant, for example. However, not limited thereto, the arrangement pitch $P_2$ and the height $h_2$ may vary depending on a position of the second surface 30b.

As shown in FIG. 6, when an angle defined by the inclined surface 31a and the normal direction of the light emergent surface (XZ plane) of the light guide plate 20 is represented as θ1, an angle defined by the inclined surface 31b and the normal direction of the light emergent surface (XZ plane) of the light guide plate 20 is represented as θ2, and a refractive index of the first optical shape layer 22 or the second optical shape layer 23 is represented as n, the angle θ1 and the angle θ2 are preferably not less than {arcsin(1/n)}/2, and preferably not less than arcsin(1/n), respectively. When the angle θ1 and the angle θ2 respectively satisfy the above ranges, it can be more reliably prevented that external light is totally reflected by the inclined surface 31a and the inclined surface 31b. Thus, it can be prevented that external light incident from the right and left ends (end on the −X side, end on the +X side) of the viewer gets through to the front side of the viewer, whereby the ghost generation can be more effectively prevented. The unit shape in the second embodiment is formed such that the arrangement pitch $P_2$ is 1 μm, that the height $h_2$ is 0.18 μm, i.e., the aspect ratio A is 0.18, and that the angles θ1 and θ2 are about 19.8°.

In the second embodiment, image light L21 from the image source 11 is viewed by the viewer similarly to the aforementioned first embodiment. On the other hand, in the second embodiment, as shown in FIG. 5, external light enters the light guide plate 20 from the light incident surface (second total reflection surface) 20c on the rear side (+Y side)) of the light guide plate 20. A part of light of the external light incident on the light guide plate 20 enters the reflection layer 25 of the first surface 30a. A part of the light incident on the reflection layer 25 is reflected by the reflection layer 25 toward the rear side of the semi-transmissive reflection sheet 20, and another part of the light transmits through the reflection layer 25 of a half mirror type, so as to emerge from the light emergent surface (first total reflection surface) 20b toward the eye E of the viewer (toward the front), as shown in FIG. 5. A part of the external light incident on the second surface 30b is diffused by the micro concavo-convex shape, and almost all of the light does not get through to the viewer side. In addition, as shown in FIG. 9, another part of light G22 transmits through the second surface 30b without being totally reflected, so as to emerge from the light emergent surface (first total reflection surface) 20b toward a position distant from the front of the viewer, whereby the light is not viewed by the viewer. Further, when the refractive index of the first optical shape layer 22 is greater than that of the second optical shape layer 23, external light G23 having entered the rear surface (surface on the +Y side) of the first optical shape layer 22 at a large incident angle is totally reflected by the second surface 30b (inclined surface 31b ), so as to emerge from the light emergent surface (first total reflection surface) 20b toward a position distant from the front of the viewer, whereby the light is not viewed by the viewer.

Figure 10:
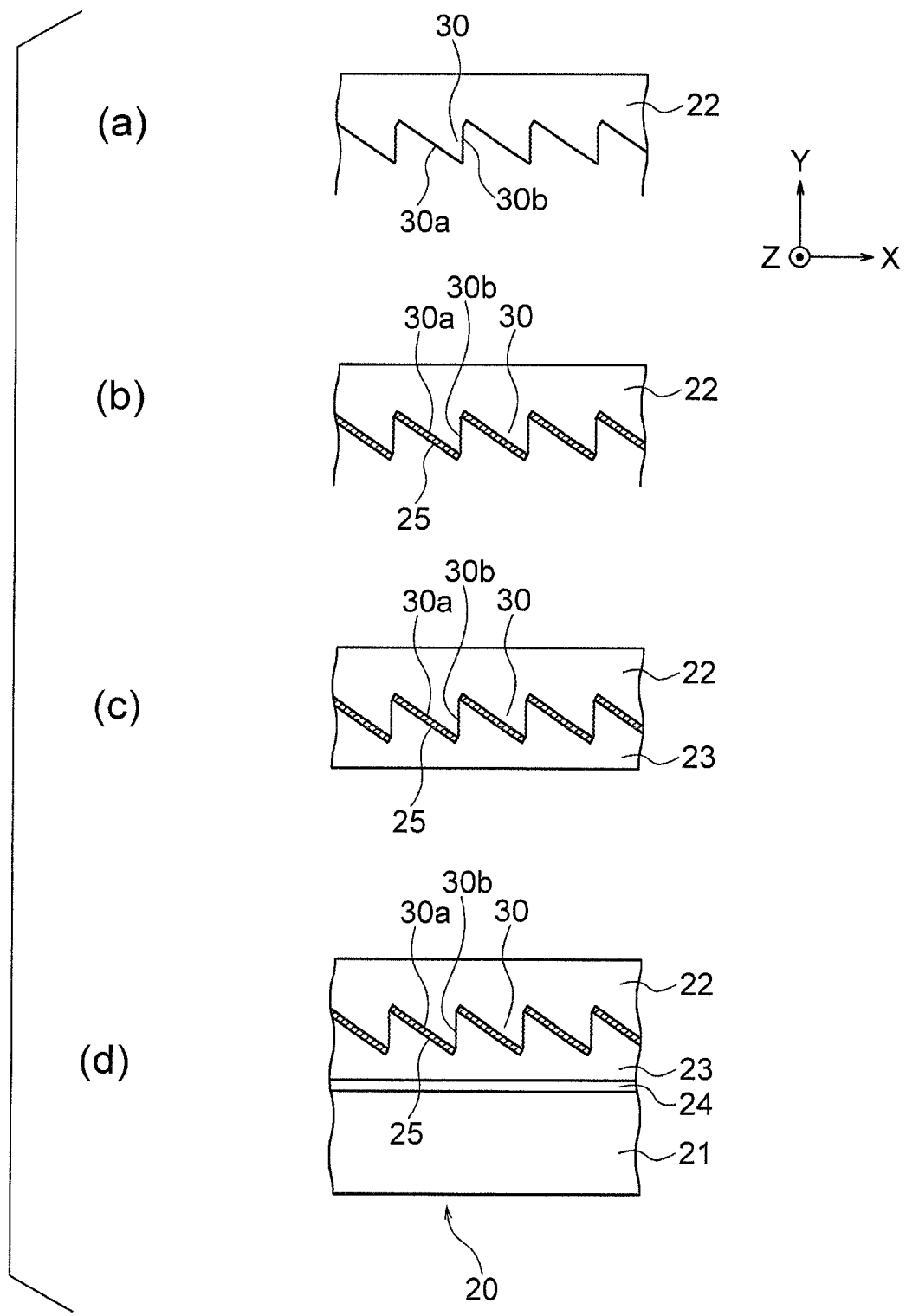
FIG. 10 is a view for explaining an example of manufacturing the semi-transmissive reflection sheet shown in FIG. 5

Next, a method of manufacturing the semi-transmissive reflection sheet 20 in the second embodiment is described. FIG. 10 is a view for explaining the method of manufacturing the semi-transmissive reflection sheet 20 in the second embodiment. FIGS. 10(a) to 10(d) are views showing a process of manufacturing the semi-transmissive reflection sheet 20.

Firstly, as shown in FIG. 10(a), the first optical shape layer 22 constituting the semi-transmissive reflection sheet 20 is formed with the use of a mold having a concavo-convex shape corresponding to the unit optical shapes 30, by means of an extrusion molding process, an injection molding process or the like. Then, as shown in FIG. 10(b), aluminum is deposited on the first surface 30a of the unit optical shape 30 by a vacuum deposition process, so that the reflection layer 25 is formed. Alternatively, the reflection layer 25 may be formed by applying a paint containing a light reflecting material.

Thereafter, as shown in FIG. 10(c), the surface of the first optical shape layer 22 on which the unit optical shapes 30 are formed is filled with a resin constituting the second optical shape layer 23. The resin is pressed by a mold having a flat surface, and cured. Then, the resin is released from the mold, so that the second optical shape layer 23 is formed. Then, as shown in FIG. 10(d), the second optical shape layer 23 formed on the unit optical shapes 30 and the planar substrate part 21 are attached to each other through joint layer 24, whereby a laminate having the substrate part 21, the joint layer 24, the second optical shape layer 23 and the first optical shape layer 22, which are laminated in this order, is completed. Finally, the laminate is cut into a predetermined shape, and the reflection surface 20a is formed by processing a corner portion on the rear side (−Y side) in the +X side (side opposite to the side on which the unit optical shapes are formed). The reflection film 27 is formed by depositing aluminum on the reflection surface 20a by a vacuum deposition process or the like. In this manner, the semi-transmissive reflection sheet 20 is completed.

In the semi-transmissive reflection sheet 20 in the second embodiment, since the second surface 30b is provided with the micro concavo-convex shape, light incident on the second surface 30b, out of external light having entered the light guide plate 20 from the rear side thereof, is prevented from being totally reflected by the second surface 30b, whereby the light can emerge at a position distant from the front of the viewer. Thus, the semi-transmissive reflection sheet 20 in this embodiment can prevent that a ghost is generated in the external light transmitting therethrough, which makes unclear the external light viewed by the viewer.

In addition, when the arrangement pitch of the unit shapes 31 constituting the micro concavo-convex shape is represented as $P_2$, the distance between the bottom portion b of the unit shape 31 and the top portion p thereof is represented as $h_2$, and the aspect ratio therebetween is represented as $A=h_2/P_2$, the semi-transmissive reflection sheet 20 satisfies 0.05≤A≤0.5. Thus, it can be more efficiently prevented that a large part of light incident on the second surface 30b is totally reflected by the second surface 30b, so that the light can be caused to emerge at a positon distant from the front of the viewer.

The second embodiment has been explained above, but the second embodiment can be variously modified. Herebelow, modification examples are shown.

Figure 11:
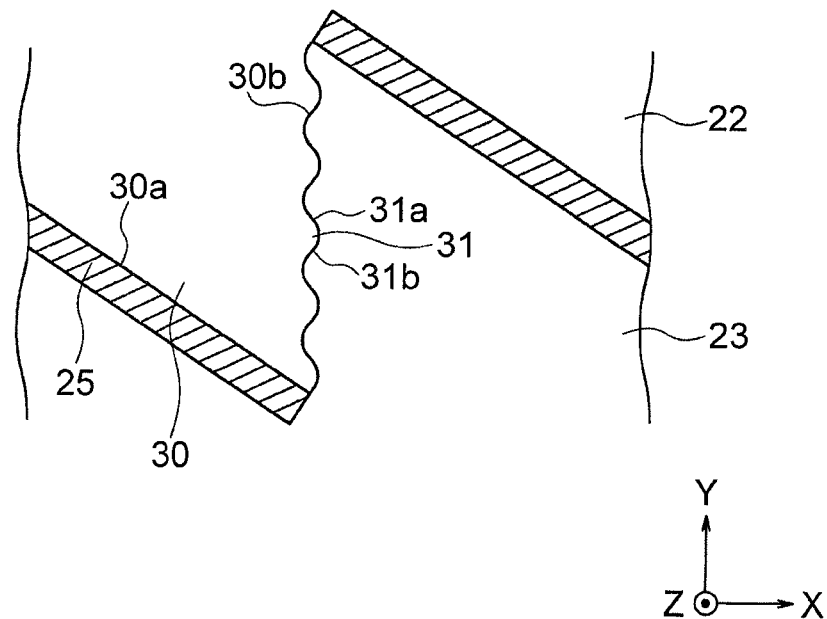
FIG. 11 is a view showing a modification example of the second surface of the unit optical shape.
Figure 12:
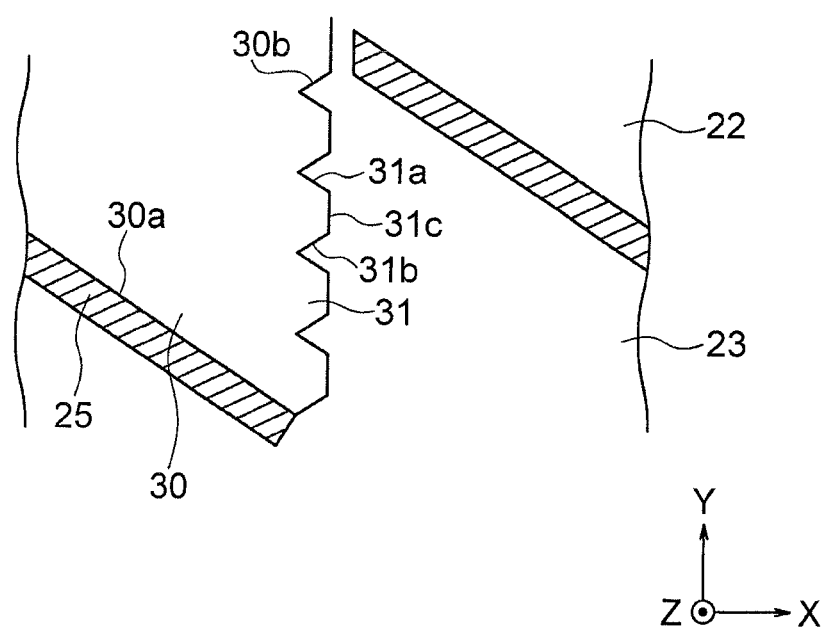
FIG. 12 is a view showing another modification example of the second surface of the unit optical shape.

(1) The concavo-convex shape of the second surface 30b described in the aforementioned second embodiment is a mere example. FIGS. 11 and 12 show modification examples of the shape of the second surface. FIGS. 11 and 12 correspond to FIG. 6.

In the aforementioned embodiment, the unit shape 31 constituting the micro concavo-convex shape of the second surface 30b is formed such that the sectional shape in the section parallel to the XY plane is substantially a triangular shape, but the present invention is not limited thereto. For example, as shown in FIG. 11, the unit shape 31 may be formed such that its sectional shape is a wave shape (sine wave shape). In this case, the unit shape 31 is composed of a curved surface 31a and a curved surface 31b. An average angle defined by the curved surface 31a and the normal direction of the light emergent surface (XZ plane) of the light guide plate 20 may be represented as the aforementioned θ1, and an average angle defined by the curved surface 31b and the normal direction of the light emergent surface (XZ plane) of the light guide plate 20 may be represented as the aforementioned θ2.

Alternatively, as shown in FIG. 12, the unit shape 31 may be formed such that its sectional shape is a trapezoidal shape. In this case, the unit shape 31 is composed of an inclined surface 31a, an inclined surface 31b and a flat surface 31c formed between the inclined surfaces. An angle defined by the curved surface 31a and the normal direction of the light emergent surface (XZ plane) of the light guide plate 20 may be represented as the aforementioned θ1, and an angle defined by the curved surface 31b and the normal direction of the light emergent surface (XZ plane) of the light guide plate 20 may be represented as the aforementioned θ2. In the embodiments shown in FIGS. 11 and 12, the unit shapes 31 of the micro concavo-convex shape can provide the same effect as that of the aforementioned semi-transmissive reflection sheet 20.

(2) In the aforementioned second embodiment, the angle β of the second surface 30b is set at 90°, for example. However, not limited to this example, the angle β may be inclined at a predetermined angle (e.g., within 2×α). Thus, the generation of ghost can be more efficiently prevented, without inhibiting image light from entering the first surface 30a.

(3) In the aforementioned second embodiment, the reflection layer 25 of the semi-transmissive reflection sheet 20 is formed all over the first surface 30a of the unit optical shape 30, for example. However, not limited to this example, the reflection layer 25 may be disposed only on a part of the first surface 30a of the unit optical shape 30.

(4) The same modification examples (3) to (7) described as the modification examples of the aforementioned first embodiment can be applied to the second embodiment.

<Third Embodiment>

Next, a display unit 1 according to a third embodiment is described. In the third embodiment, the structures related to the unit optical shape 30 and the light absorption layer 26 of the aforementioned first embodiment are modified, and the structure related to the unit optical shape 30 of the aforementioned second embodiment is modified. The third embodiment differs from the first embodiment in the following points. On the other hand, the third embodiment may have the same structure as that of the first embodiment or the second embodiment, except the matters described below.

Figure 13:
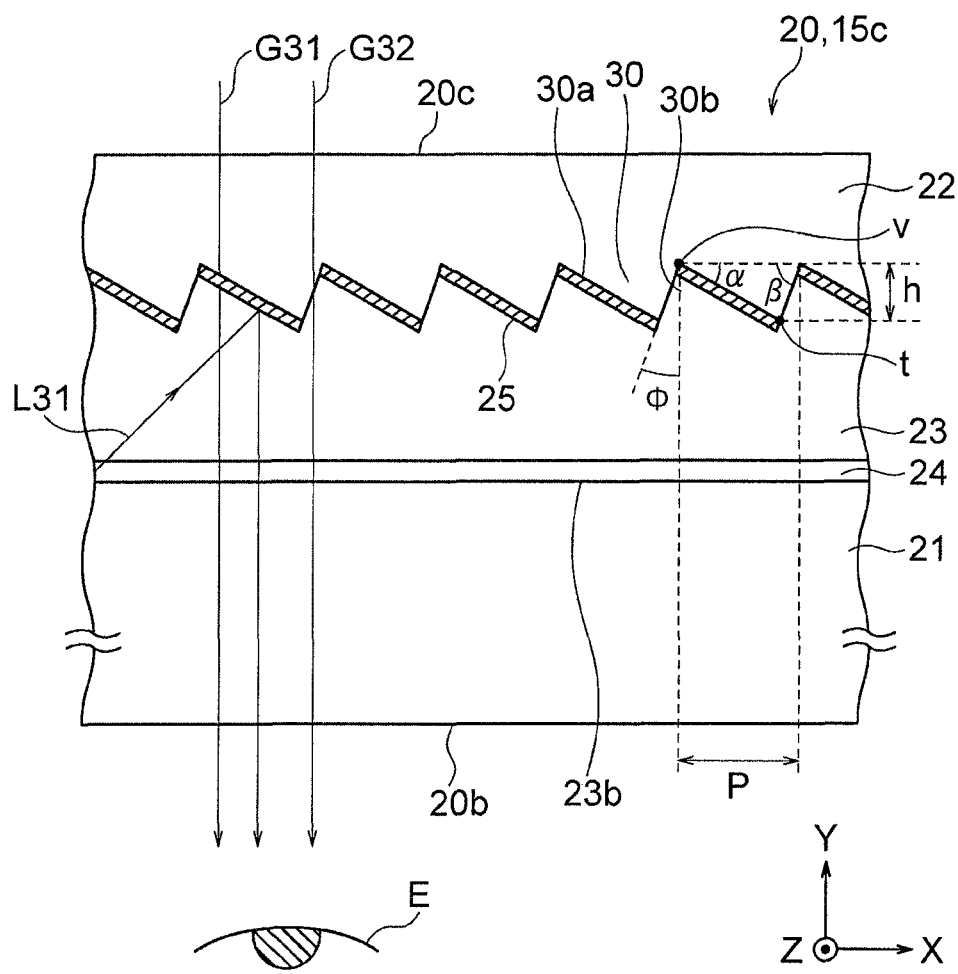
FIG. 13 is a view corresponding to FIG. 2, and a view showing a third example of the semi-transmissive reflection sheet.
Figure 14:
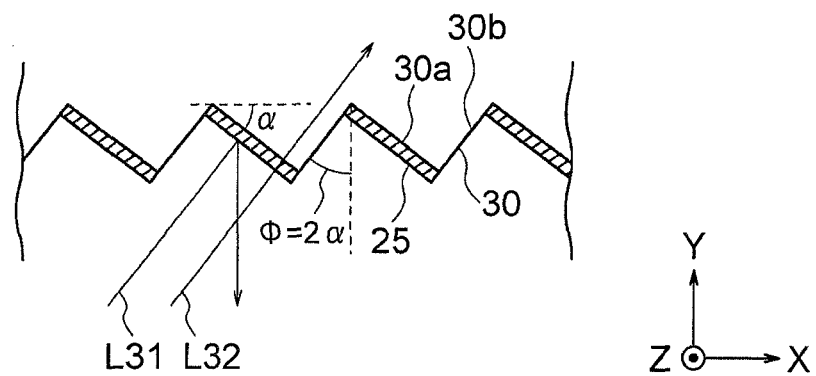
FIG. 14 is a partial enlarged view of FIG. 13, showing unit optical shapes.

As shown in FIG. 13, the semi-transmissive reflection sheet 20 includes the first optical shape layer 22, the second optical shape layer 23, the joint layer 24 and the substrate part 24, which are described in the first and second embodiments. As shown in FIGS. 13 and 14, the unit optical shape 30 of the first optical shape layer 22 has a first surface 30a and a second surface 30b. In the illustrated example, a reflection layer 25 is formed all over the first surface 30a. On the other hand, the second surface 30b is not provided with a light absorption layer 26. The first optical shape layer 22 and the second optical shape layer 23 in contact with each other via the second surface 30b to form an interface therebetween. The second surface 30b is inclined with respect to the normal direction of the second optical shape layer 23. Namely, the second surface 30b is inclined with respect to the ZX plane, and is also inclined with respect to a light emergent surface 20b of the semi-transmissive reflection sheet 20 and the sheet plane of the semi-transmissive reflection sheet 20. An inclined angle of the second surface 30b with respect to the normal direction (Y direction) of the second optical shape layer 23 is represented as ø. The second surface 30b is inclined with respect to the normal direction of the semi-transmissive reflection sheet 20.

In the semi-transmissive reflection sheet 20 in the third embodiment, in order to avoid the aforementioned problem of ghost generation, when a higher refractive index of the first optical shape layer 22 or of the second optical shape layer 23 is represented as $n_1$, and a lower refractive index is represented as $n_2$, the unit optical shape is formed such that a relationship between the angle α and the angle ø satisfies the following expression (2).

$$\arccos(n_2/n_1) \leq \text{ø} \leq 2\times\alpha \qquad \text{Expression (2)}$$

By forming the unit optical shape 30 so as to satisfy the above Expression (2), even when external light enters the second surface 30b, the external light can get through to the viewer side without being totally reflected, which is shown by external light G32 shown in FIG. 13. Thus, the aforementioned generation of ghost can be prevented, while the external light getting through to the viewer side can be made clear. If the angle ø is smaller than $\arccos(n_2/n_1)$, the external light incident on the second surface 30b is likely to be totally reflected by the second surface 30b, which is not preferred. On the other hand, if the angle ø is greater than 2×α, a part of image light incident on the first surface 30a enters the second surface 30b, which is not preferred.

When the angle ø is smaller than 2×α, after the image light had transmitted through the reflection layer 25, there is a possibility that the image light enters the reflection layer 25 of the adjacent unit optical shape 30, and it reflected by the reflection layer 25. In this case, when the image light passes through the second surface 30b (the interface between the first optical shape layer 22 and the second optical shape layer 23), the image light is refracted by the refractive index difference between the first optical shape layer 22 and the second optical shape layer 23. Thus, as compared with the image light that is reflected without having transmitted through the reflection layer 25, a light angle is slightly shifted therefrom, whereby a dual image may be somewhat generated. Thus, as shown in FIG. 14, the second surface 30b is preferably formed so as to be parallel to image light L31 incident on the reflection layer 25, i.e., the angle ø of the second surface is ø=2×α. Thus, even when image light projected from the image source 11 has transmitted through the reflection layer 25, the light guide plate 20 can prevent that the light enters the reflection layer 25 of the adjacent unit optical shape 30 (see L32 of FIG. 14). Thus, the aforementioned generation of dual image can be avoided.

In the display device 1 in the third embodiment, as shown in FIG. 13, a part of image light L31, out of image light incident on the unit optical shape 30, enters the reflection layer 25 of the first surface 30a and is reflected in a direction (−Y direction) substantially perpendicular to the first total reflection surface 20b, so as to emerge from the light emergent surface (first total reflection surface) 20b toward the eye E of the viewer. In addition, other image light transmits through the reflection layer 25 formed as a half mirror to enter the unit optical shape 30. Almost all of the image light emerges the semi-transmissive reflection sheet 20 from the rear side thereof.

External light enters the semi-transmissive reflection sheet 20 from the light incident surface (second total reflection surface) 20c of the semi-transmissive reflection sheet 20 on the rear side (+Y side) thereof. A part of light of the external light incident on the semi-transmissive reflection sheet 20 enters the reflection layer 25 of the first surface 30, and a part of the light is reflected by the reflection layer 25 toward the rear side of the semi-transmissive reflection sheet 20. However, as shown in FIG. 13, another part of light G31 transmits through the reflection layer 25 formed as a half mirror, so as to emerge from the light emergent surface (first total reflection surface) 20b toward the eye E of the viewer. In addition, other external light G32 transmits through the second surface 30b without being totally reflected, so as to emerge from the light emergent surface (first total reflection surface) 20b toward the eye E of the viewer.

The semi-transmissive reflection sheet 20 described in the third embodiment can be manufactured similarly to the semi-transmissive reflection sheet described in the second embodiment.

As described above, in the semi-transmissive reflection sheet 20 in the third embodiment, the semi-transmissive reflection layer 25 that transmits therethrough a part of image light and reflects other image light is formed on the first surface 30a, and the unit optical shape 30 is formed such that a relationship between the angle α of the first surface 30a and the angle ø satisfies ø≤2×α. Thus, the semi-transmissive reflection sheet 20 in the third embodiment can prevent that image light enters the second surface 30b, and can also prevent that external light is totally reflected by the second surface 30b even when there is a refractive index difference between the first optical shape layer 22 and the second optical shape layer 23. As a result, generation of a so-called ghost in which external light from the light emergent surface of the light guide plate 20 is viewed as a dual image can be prevented, so that the external light is prevented from becoming unclear.

In the semi-transmissive reflection sheet 20 in the third embodiment, when a higher refractive index of the first optical shape layer 22 or of the second optical shape layer 23 is represented as $n_1$, and a lower refractive index is represented as $n_2$, the unit optical shape 30 is formed such that a relationship between the angle α and the angle ø satisfies ø≥arccos($n_2$/$n_1$). Thus, in the semi-transmissive reflection sheet 20 in the third embodiment, the optical unit optical shape 30 can be formed according to a refractive index difference between the first optical shape layer 22 and the second optical shape layer 23, whereby the generation of ghost can be more efficiently prevented.

(1) In the aforementioned third embodiment, the surface of the second surface 30b may be provided with a micro concavo-convex shape such that the second surface 30b has a roughened surface. Further, the second surface of the semi-transmissive reflection sheet described in the second embodiment can be applied to the third embodiment. According to such a semi-transmissive reflection sheet 20, even when image light having transmitted through the reflection layer 25 enters the first optical shape 22 to enter the second surface 30b, the image light can be diffused by the second surface 30b, whereby the image light can be prevented from being viewed by the viewer.

(2) Modification examples similar to the above-described items (1) to (4) described as modification examples of the second embodiment can be applied to the third embodiment.

Although the first to third embodiments of the present invention have been described above, the present invention is not limited to the aforementioned embodiments, and various modifications and variations are possible. Such modifications and variations are within the technical scope of the present invention. In addition, the effects described in the embodiments are mere lists of most suitable effects produced from the present invention, and the effect provided by the present invention is not limited to those described in the embodiments. The aforementioned embodiments and their modification examples can be suitably combined, but detailed description thereof is omitted.

What is claimed is:

1. A semi-transmissive reflection sheet comprising:
   a first optical shape layer including unit optical shapes; and
   a second optical shape layer laminated on the first optical shape layer, from a side of a surface formed by the unit optical shapes;
   wherein the unit optical shapes have a first surface that is inclined with respect to a light emergent side surface of the second optical shape layer, wherein the light emergent side surface of the second optical shape layer is opposed to the first optical shape layer, and wherein the unit optical shapes have a second surface that is not parallel to the light emergent side surface of the second optical shape layer; and
   wherein a reflection layer that reflects at least a part of image light traveling in the semi-transmissive reflection sheet is provided only on part of the first surface.

2. The semi-transmissive reflection sheet according to claim 1, wherein the unit optical shapes define a convexity projecting toward the second optical shape layer;
   wherein the first surface and the second surface are opposed along a sheet plane of the semi-transmissive reflection sheet;
   wherein the first surface and the second surface are alternately arranged along an arrangement direction of the unit optical shapes; and
   wherein the reflection layer of each unit optical shape is provided on a part of the first surface that is close to the second surface of the unit optical shape along the arrangement direction of the unit optical shapes.

3. The semi-transmissive reflection sheet according to claim 1, wherein a light absorption layer that absorbs light is provided on the second surface.

4. The semi-transmissive reflection sheet according to claim 1, wherein the second surface has a concavo-convex shape.

5. The semi-transmissive reflection sheet according to claim 4, wherein the concavo-convex shape includes unit shapes arranged along the second surface; and
   wherein in a section of the unit optical shapes that is parallel to the arrangement direction of the unit optical shapes and to a normal direction of the semi-transmissive reflection sheet, an arrangement pitch of the unit shapes is represented as $P_2$, a distance between a bottom portion and a top portion of the unit shape is represented as $h_2$, and the following expression is satisfied:

$$0.05 \leq h_2/P_2 \leq 0.5.$$

6. The semi-transmissive reflection sheet according to claim 1 wherein in a section of the unit optical shapes that is parallel to the arrangement direction of the unit optical shapes and to a normal direction of the semi-transmissive reflection sheet, an angle defined by the first surface and the light emergent side surface is represented as α, an angle defined by a normal direction of the light emergent side surface and the second surface 2 is represented as ø, and the following expression is satisfied:

$$ø \leq 2 \times α.$$

7. The semi-transmissive reflection sheet according to claim 6, wherein the first optical shape layer or the second optical shape layer has a first refractive index represented as $n_1$, a second refractive index represented as $n_2$, wherein $n_1 > n_2$, and wherein the following expression is satisfied:

$$\varnothing \leq \arccos(n_2/n_1).$$

8. The semi-transmissive reflection sheet according to claim 1, further comprising:
   an optical shape part provided with the unit optical shapes; and
   a light guide part that guides light to the unit optical shape part.

9. The semi-transmissive reflection sheet according to claim 8, wherein the light guide part is adjacent to the unit optical shape part.

10. The semi-transmissive reflection sheet according to claim 9, wherein the light guide part includes a first light guide reflection surface formed by a surface of the first optical shape layer, wherein the surface of the first optical shape layer is opposed to the second optical shape layer, and a second light guide reflection surface formed by a surface of the second optical shape layer, wherein the surface of the second optical shape layer is opposed to the first optical shape layer.

11. The semi-transmissive reflection sheet according to claim 1, wherein the first surface and the second surface are opposed along a sheet plane of the semi-transmissive reflection sheet.

12. The semi-transmissive reflection sheet according to claim 1, wherein in a section of the unit optical shapes that is parallel to the arrangement direction of the unit optical shapes and to a normal direction of the semi-transmissive reflection sheet, the unit optical shape has a triangular shape or a shape formed by chamfering corners of the triangular shape.

13. A display device comprising:
   the semi-transmissive reflection sheet according to claim 1; and
   an image source that projects image light to the semi-transmissive reflection sheet.

14. The semi-transmissive reflection sheet according to claim 1, wherein the unit optical shapes are arranged in a first direction, and each of the unit optical shapes extend linearly in a second direction that is non-parallel with respect to the first direction.

15. A light guide plate that guides image light incident thereon from an image source, the light guide plate comprising:
   a first total reflection surface that totally reflects the image light;
   a second total reflection surface that totally reflects the image light, wherein the second total reflection surface is disposed at a position opposed to the first total reflection surface;
   unit optical shapes arranged in a light guide direction of the image light, each unit optical shape having a first surface inclined with respect to the light guide direction of the image light; and
   a reflection layer provided on a part of the first surface, the reflection layer reflecting the image light which is guided by repeated total reflection between the first total reflection surface and the second total reflection surface, and causing the image light to emerge from the light guide plate;
   wherein the unit optical shape is provided with a second surface formed on a side of the first surface toward which the image light travels with respect to the first surface, the second surface being opposed to the first surface; and
   wherein the second surface is provided with a light absorption layer that absorbs light.

16. The light guide plate according to claim 15, wherein the reflection layer is provided on a side of the first surface toward which the image light travels.

17. A display device comprising:
   the light guide plate according to claim 15; and
   an image light source that projects image light to the semi-transmissive reflection sheet.

* * * * *